United States Patent
Dinan et al.

(10) Patent No.: US 10,963,183 B2
(45) Date of Patent: Mar. 30, 2021

(54) TECHNOLOGIES FOR FINE-GRAINED COMPLETION TRACKING OF MEMORY BUFFER ACCESSES

(71) Applicant: Intel Corporation, Santa Clara, CA (US)

(72) Inventors: James Dinan, Hudson, MA (US); Keith D. Underwood, Powell, TN (US); Sayantan Sur, Portland, OR (US); Charles A. Giefer, Seattle, WA (US); Mario Flajslik, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 15/463,005

(22) Filed: Mar. 20, 2017

(65) Prior Publication Data

US 2018/0267742 A1 Sep. 20, 2018

(51) Int. Cl.
*G06F 3/06* (2006.01)
*G06F 13/16* (2006.01)
*G06F 13/28* (2006.01)

(52) U.S. Cl.
CPC .......... *G06F 3/0653* (2013.01); *G06F 3/0616* (2013.01); *G06F 3/0656* (2013.01); *G06F 3/0673* (2013.01); *G06F 13/1673* (2013.01); *G06F 13/28* (2013.01)

(58) Field of Classification Search
CPC ............................. G06F 3/0653; G06F 13/28
See application file for complete search history.

(56) References Cited

U.S. PATENT DOCUMENTS

| | | | |
|---|---|---|---|
| 6,338,095 B1 * | 1/2002 | Yasuda | G06F 9/544 370/351 |
| 8,521,934 B1 | 8/2013 | Ni | |
| 9,069,672 B2 * | 6/2015 | Abts | G06F 12/1009 |
| 2009/0222596 A1 * | 9/2009 | Flynn | G06F 3/0643 710/22 |

(Continued)

FOREIGN PATENT DOCUMENTS

WO 2007/003985 1/2007

OTHER PUBLICATIONS

Extended European Search Report in European Patent Application No. 18152857.1, dated Jul. 23, 2018 (6 pages).

(Continued)

*Primary Examiner* — Charles Rones
*Assistant Examiner* — Tian-Pong Chang
(74) *Attorney, Agent, or Firm* — Compass IP Law PC

(57) ABSTRACT

Technologies for fine-grained completion tracking of memory buffer accesses include a compute device. The compute device is to establish multiple counter pairs for a memory buffer. Each counter pair includes a locally managed offset and a completion counter. The compute device is also to receive a request from a remote compute device to access the memory buffer, assign one of the counter pairs to the request, advance the locally managed offset of the assigned counter pair by the amount of data to be read or written, and advance the completion counter of the assigned counter pair as the data is read from or written to the memory buffer. Other embodiments are also described and claimed.

30 Claims, 8 Drawing Sheets

(56) References Cited

U.S. PATENT DOCUMENTS

2011/0246686 A1    10/2011   Cavanagh, Jr. et al.

OTHER PUBLICATIONS

"The Portals 4.0.2 Network Programming Interface," Brian W. Barrett, Ron Brightwell, Ryan E. Grant, Scott Hemmert, Kevin Pedretti, Kyle Wheeler, Keith Underwood, Rolf Riesen, Arthur B. Maccabe, and Trammell Hudson. Sandia National Laboraties Technical Report SAND2014-19568. Oct. 2014.

"Porting GASNet to Portals: Partitioned Global Address Space (PGAS) Partitioned Global Address Space (PGAS) Language Support for the Cray XT", Dan Bonachea, Paul Hargrove, Michael Welcome, Katherine Yelick. Cray User Group(CUG). 2009.

* cited by examiner

TECHNOLOGIES FOR FINE-GRAINED COMPLETION TRACKING OF MEMORY BUFFER ACCESSES

STATEMENT REGARDING FEDERALLY SPONSORED RESEARCH

This invention was made with Government support under contract number H98230A-13-D-0124 awarded by the Department of Defense. The Government has certain rights in this invention.

BACKGROUND

High performance computing (HPC) communication methods typically expose regions of user-level memory within a process for remote direct memory access (RDMA). Some systems expose a relatively large section of memory (e.g., a relatively large buffer) for remote access (e.g., by remote compute devices) and utilize a receiver-managed data access pointer, known as a locally managed offset (LMO), to indicate the next available location in the memory buffer. However, the locally managed offset, alone, does not indicate the completion status of the remote memory access operation that caused the LMO to advance to a new location in the memory buffer. Accordingly, some systems additionally use a separate pointer, known as a completion counter (CC), which indicates the number of completed bytes read or written from or to the memory buffer. However, when multiple remote memory access operations are pending, unordered messages and retransmissions make it difficult to determine which of the pending operations have completed. Accordingly, even with a completion counter, it may not be possible to determine which regions of the memory buffer have stabilized (i.e., are no longer being accessed by a remote memory access operation). Generally, a process can only guarantee data stabilization for a given memory buffer when the LMO and CC are equal. Accordingly, the continual arrival of remote access requests can cause the CC to continually lag behind the LMO, leading to long delays in determining which portions of the memory buffer are no longer being utilized by the remote access operations.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
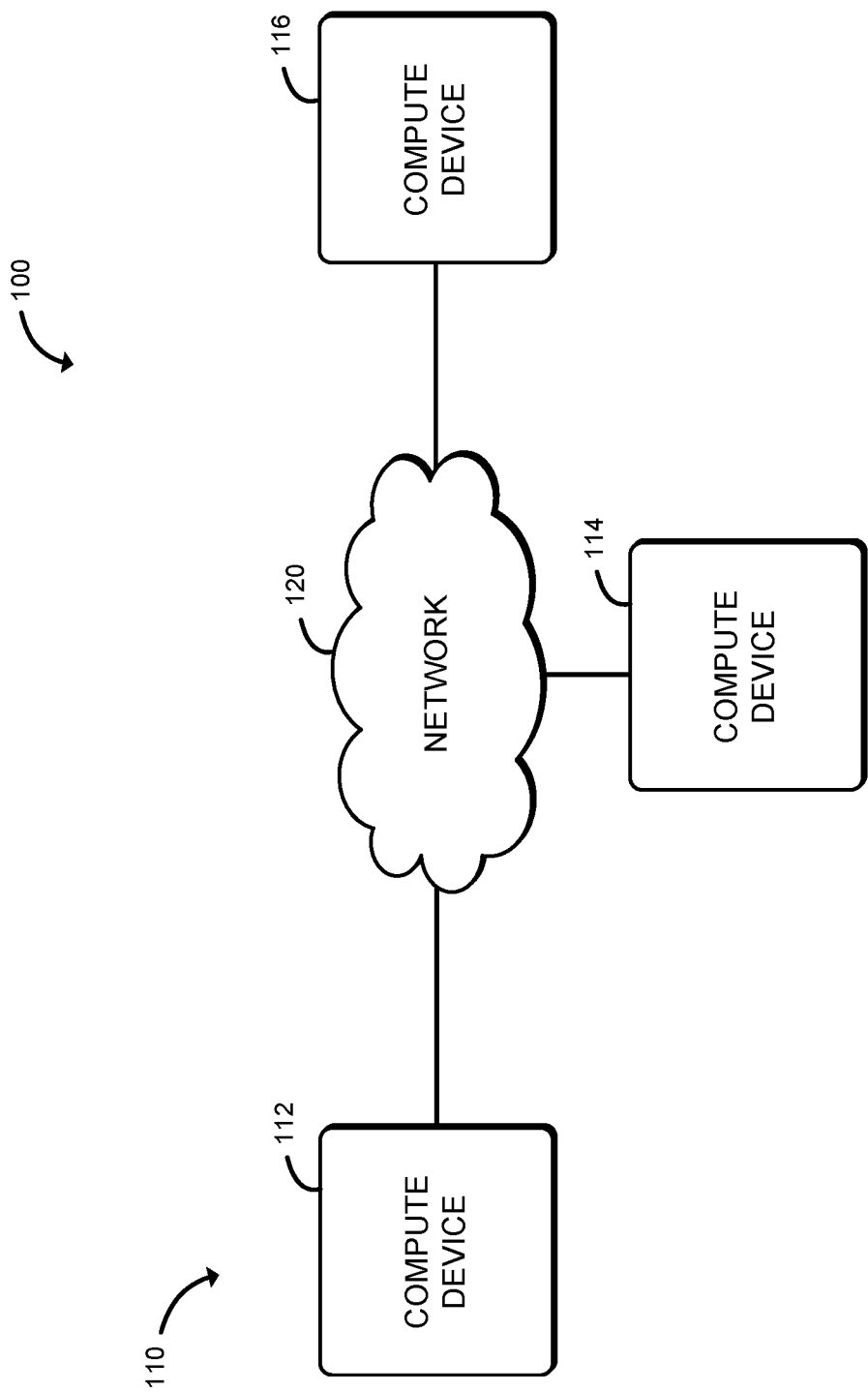
FIG. 1 is a simplified block diagram of at least one embodiment of a system for performing fine-grained tracking of memory buffer accesses.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative system 100 for performing fine-grained tracking of memory buffer access includes a set of compute devices 110 in communication via a network 120. The set of compute devices 110 includes compute devices 112, 114, and 116. While three compute devices 110 are shown in the set, it should be understood that in other embodiments, the set may include a different number of compute devices 110. The system 100 may be located in a data center and provide storage and compute services (e.g., cloud services) on behalf of one or more client devices (not shown). In doing so, the one or more of the compute devices 110 may access a buffer in the memory of another of the compute devices 110 through the network 120. In operation, the compute device 110 whose memory is accessed remotely maintains a pool of counter pairs and a stable pointer. The compute device 110, in operation, assigns a counter pair to one or more requests to access the memory buffer. Each counter pair includes a locally managed offset (LMO) indicative of a total amount of memory (e.g., a number of bytes) that have been reserved for the request(s) associated with the LMO, and a completion counter that tracks the actual amount of data processed (e.g., written or read) in connection with the requests. By assigning counter pairs to different memory access requests, the progress and completion of the requests (i.e., completion of the access operations associated with the requests) may be tracked more accurately and with better resolution than in typical systems. In particular, by tracking different requests with different counter pairs, the completion counter associated with a counter pair may eventually reach the same location in the memory buffer as the corresponding locally managed offset, rather than continually "following" the locally managed offset as additional requests are received and serviced. When the completion counter is at the same location as the locally managed offset, the compute device 110, in the illustrative embodiment, retires the counter pair, returning it to the pool of available counter pairs to be used to track the progress of other memory access requests. Additionally, by retiring counter pairs as described above, the compute device 110 may more efficiently identify regions of the memory buffer that are no longer being operated on and update the stable pointer (SP) accordingly, thereby making those regions available for use by other operations (e.g., remote or local read or write operations). To further enhance the efficiency of coordinating remote access to the memory buffer, the compute device 110, in the illustrative embodiment includes dedicated circuitry, such as a dedicated counter logic unit in a host fabric interface to perform the above-described functions, rather than relying on the general purpose CPU to coordinate remote access to the memory buffer.

Figure 2:
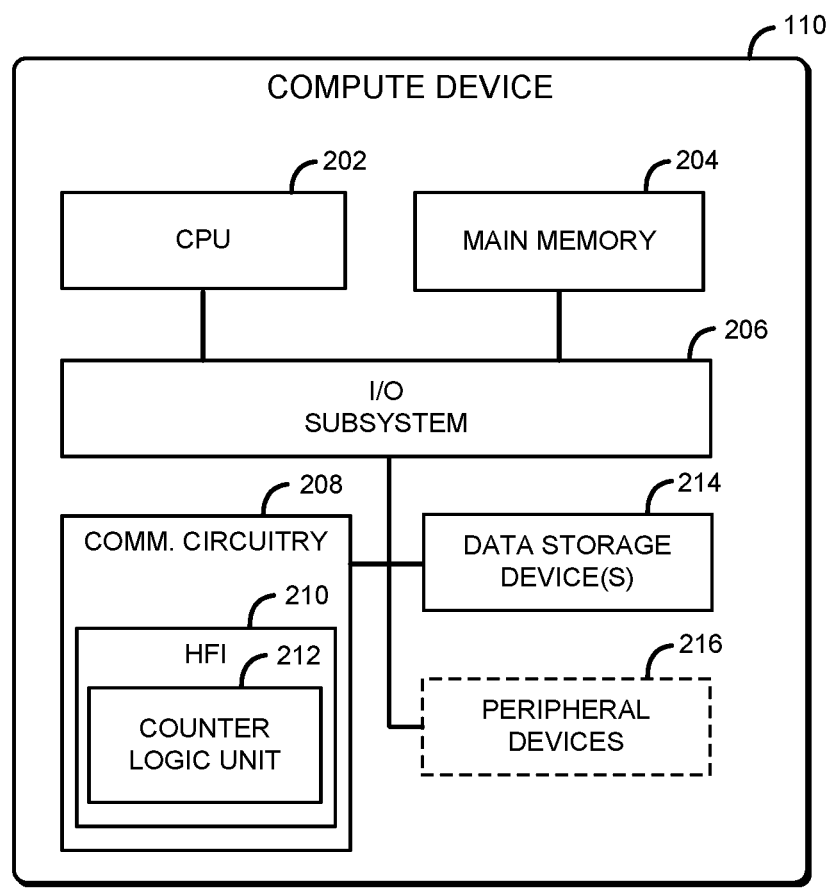
FIG. 2 is a simplified block diagram of at least one embodiment of a compute device of the system of FIG. 1.

Referring now to FIG. 2, the compute device 110 may be embodied as any type of compute device capable of performing the functions described herein, including receiving requests from other compute devices 110 to access a memory buffer, tracking the status of multiple concurrent remote memory accesses to the memory buffer using multiple counter pairs, and maintaining a stable pointer indicative of regions of the memory buffer that have stabilized (i.e., are no longer being operated on by a remote memory access process). As shown in FIG. 2, the illustrative compute device 110 includes a central processing unit (CPU) 202, a main memory 204, an input/output (I/O) subsystem 206, communication circuitry 208, and one or more data storage devices 214. Of course, in other embodiments, the compute device 110 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 204, or portions thereof, may be incorporated in the CPU 202.

The CPU 202 may be embodied as any type of processor capable of performing the functions described herein. The CPU 202 may be embodied as a single or multi-core processor(s), a microcontroller, or other processor or processing/controlling circuit. In some embodiments, the CPU 202 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the main memory 204 may be embodied as any type of volatile (e.g., dynamic random access memory (DRAM), etc.) or non-volatile memory or data storage capable of performing the functions described herein. In some embodiments, all or a portion of the main memory 204 may be integrated into the CPU 202. In operation, the main memory 204 may store various software and data used during operation such as request data, counter data, operating systems, applications, programs, libraries, and drivers.

The I/O subsystem 206 may be embodied as circuitry and/or components to facilitate input/output operations with the CPU 202, the main memory 204, and other components of the compute device 110. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the CPU 202, the main memory 204, and other components of the compute device 110, on a single integrated circuit chip.

The communication circuitry 208 may be embodied as any communication circuit, device, or collection thereof, capable of enabling communications over the network 120 between the compute device 110 and another compute device 110. The communication circuitry 208 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 208 includes a host fabric interface (HFI) 210, which may also be referred to as a network interface controller (NIC). The communication circuitry 208 may be located on silicon separate from the CPU 202, or the communication circuitry 208 may be included in a multi-chip package with the CPU 202, or even on the same die as the CPU 202. The HFI 210 may be embodied as one or more add-in-boards, daughtercards, network interface cards, controller chips, chipsets, specialized components such as a field programmable gate array (FPGA) or application specific integrated circuit (ASIC), or other devices that may be used by the compute device 110 to connect with another compute device 110 and perform remote memory access operations. In some embodiments, HFI 210 may be embodied as part of a system-on-a-chip (SoC) that includes one or more processors, or included on a multichip package that also contains one or more processors. In some embodiments, the HFI 210 may include a local processor (not shown) and/or a local memory (not shown) that are both local to the HFI 210. In such embodiments, the local processor of the HFI 210 may be capable of performing one or more of the functions of the CPU 202 described herein. Additionally or alternatively, in such embodiments, the local memory of the HFI 210 may be integrated into one or more components of the compute device 110 at the board level, socket level, chip level, and/or other levels. In the illustrative embodiment, the HFI 210 includes counter logic unit 212, which may be embodied as any circuitry or device capable of tracking the status of multiple concurrent remote accesses to a buffer of the memory 204 using multiple counter pairs, and maintaining a stable pointer indicative of regions of the memory buffer that have stabilized (e.g., are no longer being operated on by a remote memory access process). In some embodiments, the counter logic unit 212 may be embodied as one or more specialized components, such as an FPGA or ASIC, to perform the operations of the counter logic unit 212 more efficiently than a general purpose processor.

The one or more illustrative data storage devices 214 may be embodied as any type of devices configured for short-term or long-term storage of data such as, for example, memory devices and circuits, memory cards, hard disk drives, solid-state drives, or other data storage devices. Each data storage device 214 may include a system partition that stores data and firmware code for the data storage device 214. Each data storage device 214 may also include an operating system partition that stores data files and executables for an operating system.

Additionally, the compute device 110 may include one or more peripheral devices 216. Such peripheral devices 216 may include any type of peripheral device commonly found in a compute device such as a display, speakers, a mouse, a keyboard, and/or other input/output devices, interface devices, and/or other peripheral devices.

As described above, the compute devices 110 are illustratively in communication via the network 120, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
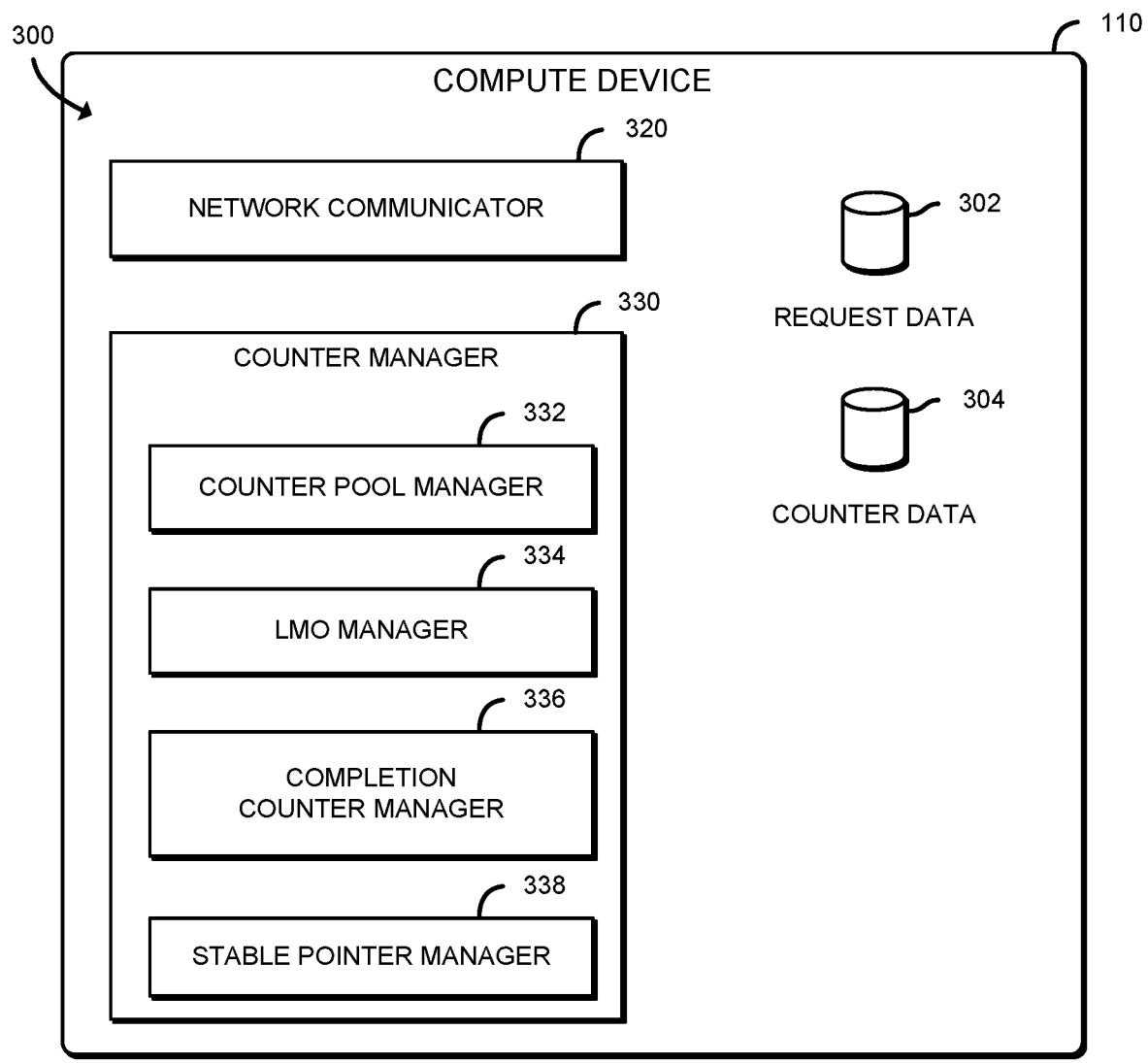
FIG. 3 is a simplified block diagram of an environment that may be established by the compute device of FIGS. 1 and 2.

Referring now to FIG. 3, in the illustrative embodiment, the compute device 110 may establish an environment 300 during operation. The illustrative environment 300 includes a network communicator 320 and a counter manager 330. Each of the components of the environment 300 may be embodied as hardware, firmware, software, or a combination thereof. As such, in some embodiments, one or more of the components of the environment 300 may be embodied as circuitry or a collection of electrical devices (e.g., network communicator circuitry 320, counter manager circuitry 330, etc.). It should be appreciated that, in such embodiments, one or more of the network communicator circuitry 320 or counter manager circuitry 330 may form a portion of one or more of the communication circuitry 208, the HFI 210, the counter logic unit 212, the CPU 202, the main memory 204, the I/O subsystem 206, and/or other components of the compute device 110. In the illustrative embodiment, the environment 300 includes request data 302 which may be embodied as any data indicative of identifiers (e.g., process numbers, alphanumeric tags, etc.) of each remote memory access request serviced by the compute device 110 and identifiers of the compute devices 110 accessing the memory 204 in association with the requests (e.g., media access control (MAC) addresses, Internet protocol (IP) addresses, etc.). Additionally, in the illustrative embodiment, the environment 300 includes counter data 304 which may be embodied as any data indicative of a set of counter pairs, the status of each counter pair (e.g., in use, retired, etc.), the location (e.g., value) of each completion counter and locally managed offset in the memory buffer, and the location (e.g., value) of the stable pointer.

In the illustrative environment 300, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the compute device 110, respectively, including requests to access a buffer of the memory 204. To do so, the network communicator 320 is configured to receive and process data packets from one system or compute device 110 and to prepare and send data packets to another compute device 110. Accordingly, in some embodiments, at least a portion of the functionality of the network communicator 320 may be performed by the communication circuitry 208, and, in the illustrative embodiment, by the HFI 210.

The counter manager 330, which may be embodied as hardware, firmware, software, virtualized hardware, emulated architecture, and/or a combination thereof as discussed above, is configured to establish a pool (e.g., a set of multiple) of counter pairs, track the status of multiple concurrent remote accesses to a buffer of the memory 204 using multiple counter pairs, and continually update a stable pointer indicative of regions of the memory buffer that have stabilized (e.g., are no longer being operated on by a remote memory access process). To do so, in the illustrative embodiment, the counter manager 330 includes a counter pool manager 332, a locally managed offset (LMO) manager 334, a completion counter manager 336, and a stable pointer manager 338. The counter pool manager 332, in the illustrative embodiment, is configured to establish the pool of counter pairs, determine the status of each counter pair (e.g., in use, retired, etc.), and determine which counter pair to assign to a remote memory access request. The LMO manager 334, in the illustrative embodiment, is configured to update the location (e.g., value) of the LMO for each counter pair that is in use (e.g., assigned to one or more remote memory access requests). In doing so, the LMO manager 334 may identify the amount of data associated with the request (e.g., the amount of data to be written or read) and advance the location (e.g., value) of the corresponding LMO by that amount. In the illustrative embodiment, the amount of data associated with the remote memory access request is included as a parameter of the request.

The completion counter manager 336, in the illustrative embodiment, is configured to update the location (e.g., value) of each counter pair that is in use (e.g., assigned to one or more remote memory access requests). In doing so, the completion counter manager 336 may advance the completion counter by the amount of data associated with the corresponding remote memory access request when the remote memory access request has been completed. The completion counter manager 336 may determine when the corresponding remote memory access request has been completed by comparing the amount of data initially specified as a parameter to the request to the amount of data actually processed (e.g., received by the communication circuitry 208 and written to the buffer in the memory 204 or read from the buffer and sent by the communication circuitry 208), by receiving a message from a local software stack of the compute device 110 that the request is complete, and/or by receiving a similar message from the remote compute device 110 that remotely accessed the memory 204. The stable pointer manager 338, in the illustrative embodiment, is configured to continually update the location (e.g., value) of the stable pointer to indicate the region of the memory buffer that is no longer being operated on (e.g., written to or read from) by a remote compute device 110. In the illustrative embodiment, the stable pointer manager 338 may determine whether to advance the stable pointer in response to detecting that a counter pair has been retired (e.g., when the completion counter is equal to the locally managed offset for the counter pair). In other embodiments, the stable pointer manager 338 may periodically (e.g., at a predefined frequency) determine whether to advance the stable pointer, rather than doing so in response to the retirement of a counter pair.

It should be appreciated that each of the counter pool manager 332, the LMO manager 334, the completion counter manager 336, and the stable pointer manager 338 may be separately embodied as hardware, firmware, software, virtualized hardware, emulated architecture, and/or a combination thereof. For example, the counter pool manager 332 may be embodied as a hardware component, while the LMO manager 334, the completion counter manager 336, and stable pointer manager 338 are embodied as virtualized hardware components or as some other combination of hardware, firmware, software, virtualized hardware, emulated architecture, and/or a combination thereof.

Figure 4:
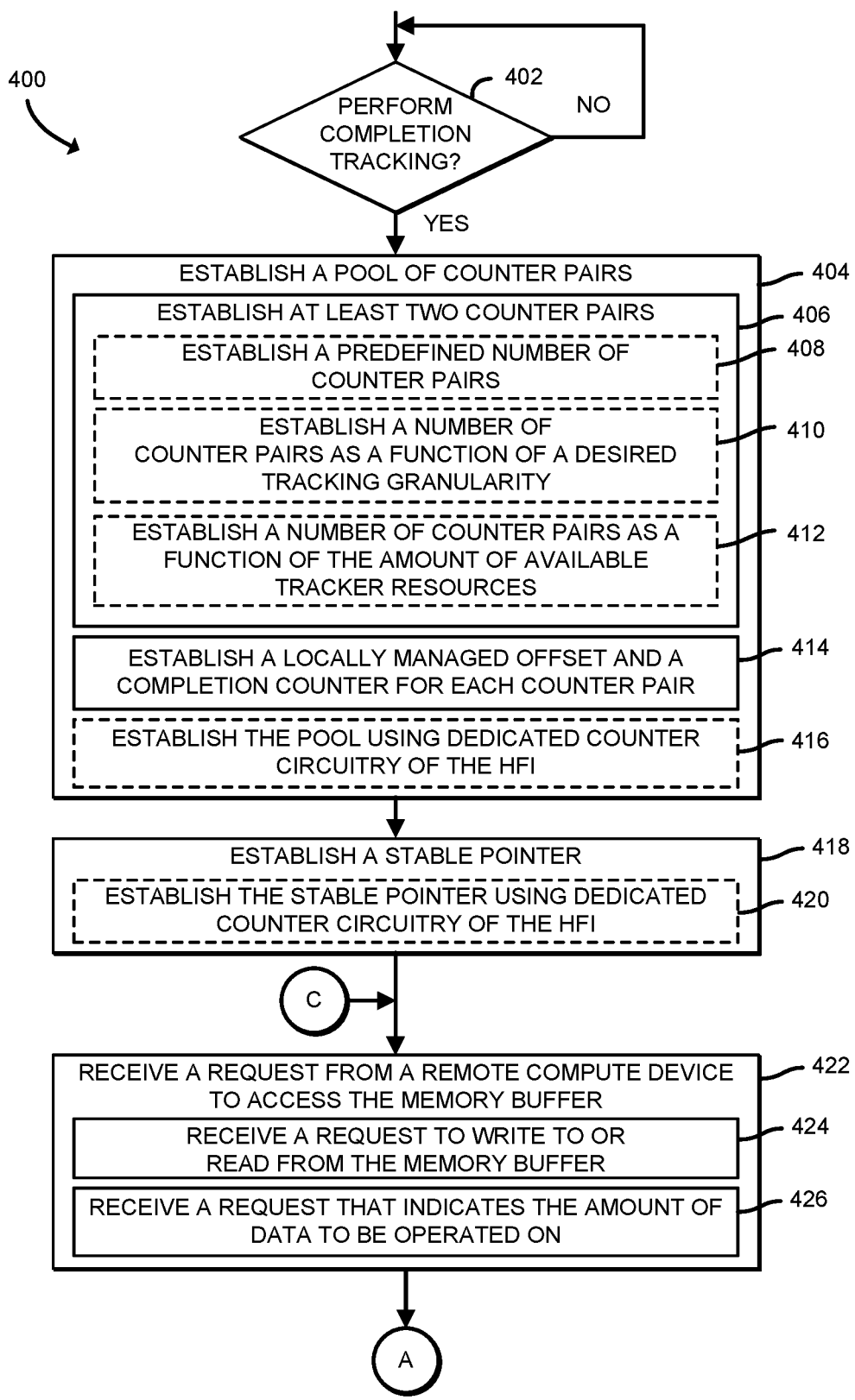
FIG. 4-6 are a simplified flow diagram of at least one embodiment of a method for tracking the completion status of memory buffer accesses, that may be performed by the compute switch of FIGS. 1 and 2.

Referring now to FIG. 4, in use, the compute device 110 may execute a method 400 for tracking the completion status of memory buffer accesses. The method 400 begins with block 402 in which the compute device 110 determines whether to perform completion tracking. In the illustrative embodiment, the compute device 110 determines to perform completion tracking if the compute device 110 is powered on and in communication with at least one other compute device 110 through the network 120. In other embodiments, the compute device 110 may determine whether to perform completion tracking based on other criteria. Regardless, in response to a determination to perform completion tracking, the method 400 advances to block 404, in which the compute device establishes a pool of counter pairs. In establishing the pool of counter pairs, the compute device 110 may reserve memory or identify registers to store the values of the completion counter and locally managed offset for each counter pair. In the illustrative embodiment, in establishing the pool of counter pairs, the compute device 110 establishes at least two counter pairs, as indicated in block 406. As such, and as explained in more detail below, the compute device 110 is able to independently track the completion status of multiple concurrent remote memory access requests. As indicated in block 408, in establishing at least two counter pairs, the compute device 110 may establish a predefined number of counter pairs (e.g., a number of counter pairs specified in a configuration file, etc.). As indicated in block 410, the compute device 110 may establish a number of counter pairs as a function of a desired tracking granularity. For example, if an administrator of the compute device 110 determines that it would be desirable to independently track the completion status of a particular number (e.g., three) of concurrent remote memory access requests, the administrator may specify that number (e.g., through a user interface) and the compute device 110 may establish a corresponding number of counter pairs. Additionally or alternatively, as indicated in block 412, the compute device 110 may establish the number of counter pairs as a function of the amount of available tracker resources, such as the number of registers or the amount of memory available (e.g., in the dedicated counter logic unit 212) to store the values of a completion counter and locally managed offset for each counter pair. As indicated in block 414, in establishing the pool of counter pairs, the compute device 110 establishes a locally managed offset and a completion counter for each counter pair. In the illustrative embodiment, the compute device 110 uses the dedicated counter circuitry (e.g., the counter logic unit 212) of the HFI 210 to establish the pool of counter pairs, as indicated in block 416. In establishing the counter pairs, the compute device 110 may set the initial values (e.g., locations) of the locally managed offset and completion counter to a beginning location (e.g., a start address in the memory 204) of a memory buffer that is available for remote access.

Still referring to FIG. 4, the compute device 110 additionally establishes a stable pointer to indicate the region of the memory buffer that no remote access requests are operating on, as indicated in block 418. In establishing the stable pointer, the compute device 110, in the illustrative embodiment, sets the value of the stable pointer to be equal to the value of the completion counters and locally managed offsets that were established in block 404 (e.g., to point to the start address of the memory buffer). In the illustrative embodiment, the compute device 110 establishes the stable pointer using dedicated counter circuitry (e.g., the counter logic unit 212) of the HFI 210, as indicated in block 420. Subsequently, in block 422, the compute device 110 receives a request from a remote compute device 110 (e.g., through the network 120) to access the memory buffer. In doing so, the compute device 110 may receive a request to write to or read from the memory buffer, as indicated in block 424. Further, as indicated in block 426, the compute device 110 may receive an indication of the amount of data (e.g., number of bytes) to be operated on (e.g., written or read) as a parameter of the request. Subsequently, the method 400 advances to block 428 of FIG. 5, in which the compute device 110 determines whether to assign an unused counter pair to the request.

Figure 5:
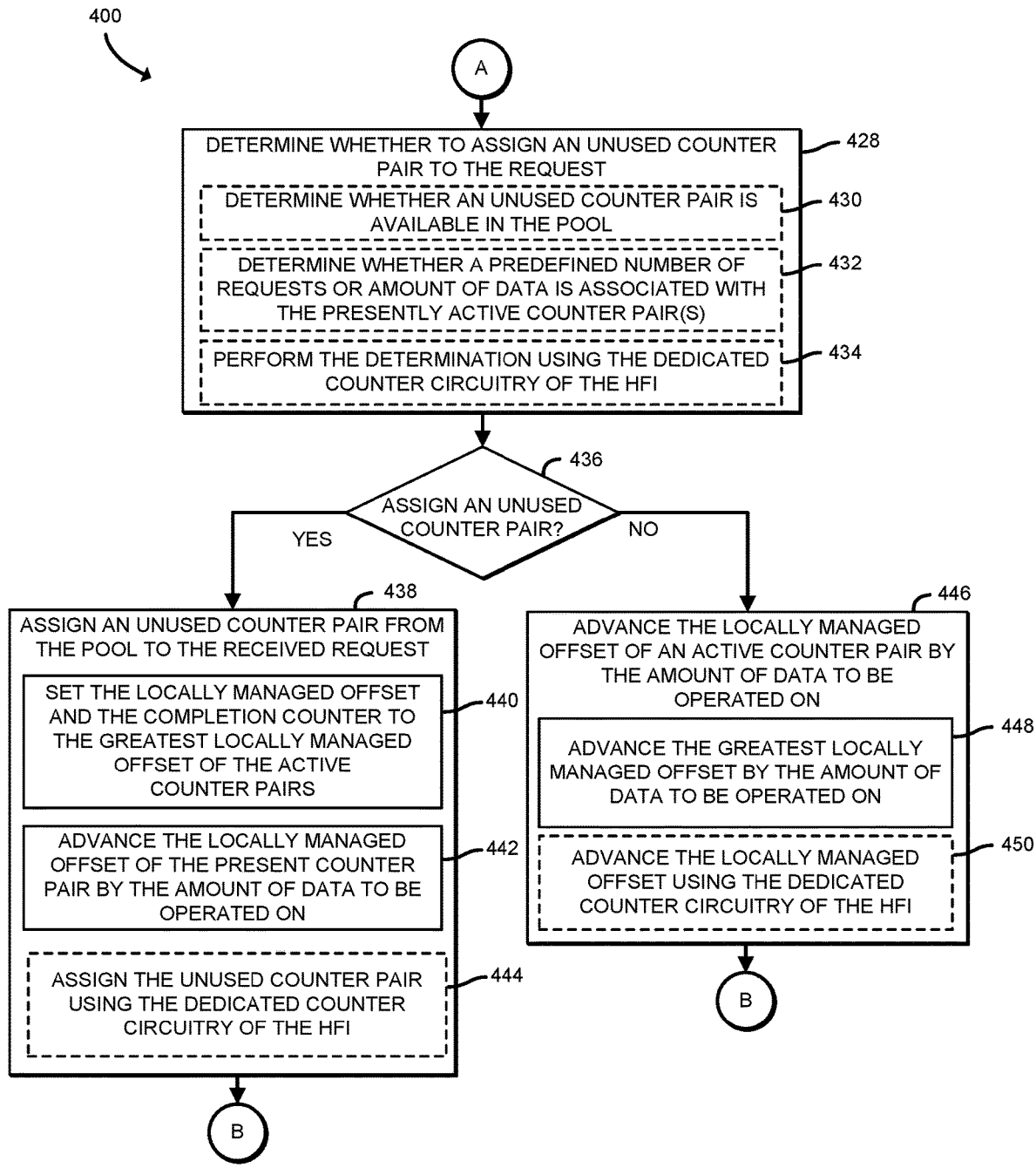

Referring now to FIG. 5, in determining whether to assign an unused counter pair to the request, the compute device 110 may determine whether an unused counter pair is available in the pool, as indicated in block 430. Additionally or alternatively, the compute device 110 may determine whether a predefined number of requests or amount of data is associated with a presently active counter pair, as indicated in block 432. For example, in some embodiments, if a new request has been received and a counter pair is available and not currently assigned to any remote memory access requests, the compute device 110 may determine to assign the presently available counter pair to the request (e.g., a "greedy algorithm"). By contrast, in other embodiments, the compute device 110 may assign an unused counter pair to the newly received request only if the presently assigned counter pairs (if any) are each presently tracking a threshold number (e.g., more than one) of remote memory access requests or a threshold amount of data (e.g., a threshold number of bytes) associated with any number of remote memory access requests and at least one unused counter pair is available in the pool. In the illustrative embodiment, as indicated in block 434, the compute device 110 performs the determination of whether to assign an unused counter pair with the dedicated counter circuitry (e.g., the counter logic unit 212) of the HFI 210.

In block 436, the method 400 advances along one of two paths, based on whether the compute device 110 determined to assign an unused counter pair to the newly received request. If the compute device 110 determined to assign an unused counter pair, the method 400 advances to block 438, in which the compute device 110 sets the locally managed offset and the completion counter of the newly assigned counter pair to the greatest locally managed offset of the active (e.g., presently assigned) counter pairs, if any, as indicated in block 440. Additionally, in the illustrative embodiment and as indicated in block 442, the compute device 110 advances the locally managed offset associated with the newly assigned counter pair by the amount of data to be operated on (e.g., the amount of data indicated in the request, as described in connection with block 426 of FIG. 4). As indicated in block 444, in the illustrative embodiment, the compute device 110 assigns the unused counter pair using the dedicated counter circuitry (e.g., the counter logic unit 212) of the HFI 210. Referring back to block 436, if the compute device 110 instead determined not to assign an unused counter pair to the request, the method 400 proceeds to block 446, in which the compute device 110 advances the locally managed offset of an active counter pair by the amount of data to be operated on (e.g., the amount of data indicated in the request, as described in connection with block 426 of FIG. 4). In doing so, the compute device 110 advances the locally managed offset that is the furthest along in the memory buffer (e.g., having the greatest value) of the locally managed offsets that are presently in use. In the illustrative embodiment, the compute device 110 advances the locally managed offset using the dedicated counter circuitry (e.g., the counter logic unit 212) of the HFI 210, as indicated in block 450. Regardless of whether the compute device 110 assign an unused counter pair or one that was already in use, the method 400 subsequently advances to block 452 of FIG. 6, in which the compute device 110 operates on the memory buffer to complete the request and any other previously-received requests that may be pending.

Figure 6:
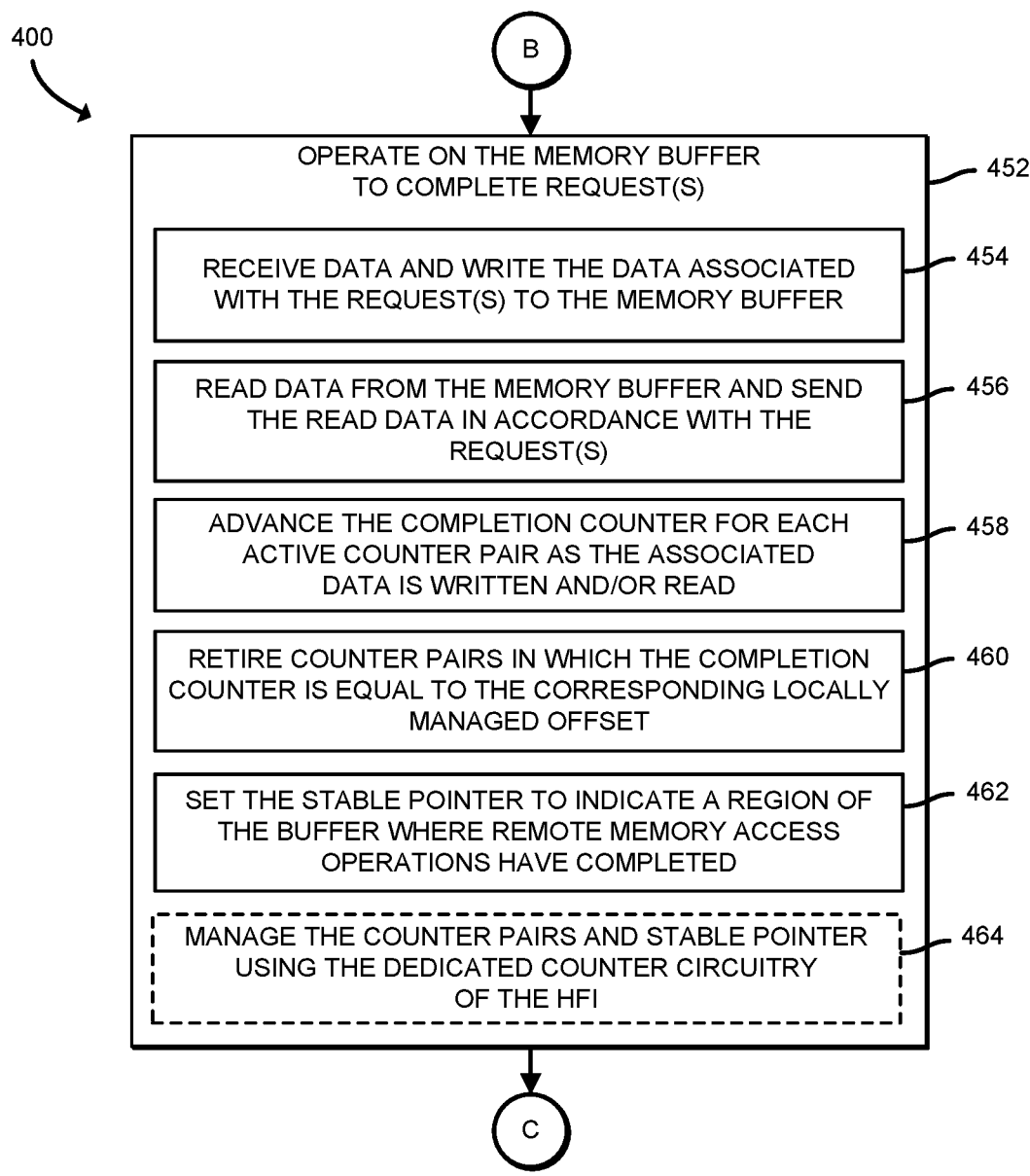

Referring now to FIG. 6, in operating on the memory buffer, the compute device 110, in the illustrative embodiment, may receive data and write the data associated with the request(s) to the memory buffer, as indicated in block 454. As indicated in block 456, the compute device 110 may additionally or alternatively read data from the memory buffer and send the read data in accordance with one or more received request. In operating on the memory buffer, the compute device 110, in the illustrative embodiment, advances the completion counter for each active counter pair as the associated data is written to or read from the memory buffer, as indicated in block 458. Additionally, in the illustrative embodiment, the compute device 110 retires any counter pairs in which the completion counter is equal to the corresponding locally managed offset, as indicated in block 460. Further, as indicated in block 462, the compute device 110 sets the stable pointer to the portion of the memory buffer where remote access operations have completed (e.g., where no data is being written or read by a remote compute device). As indicated in block 464, in the illustrative embodiment, the compute device 110 manages the counter pairs and the stable pointer using the dedicated counter circuitry (e.g., the counter logic unit 212) of the HFI 210. Subsequently, the method 400 loops back to block 422 in which the compute device 110 awaits another request from a remote compute device 110 to access the memory buffer.

Figure 7:
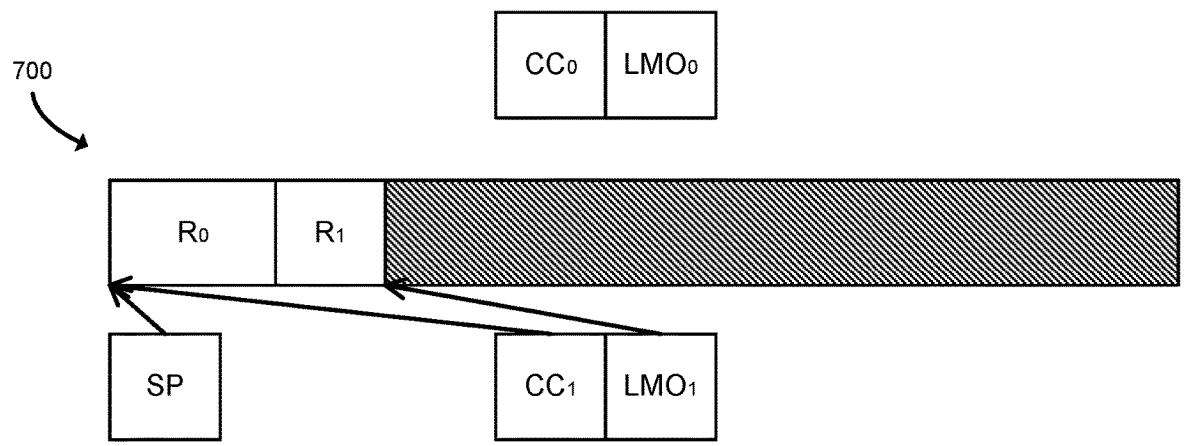
FIGS. 7-10 are simplified block diagrams of sequential stages of tracking the completion of memory buffer accesses as multiple memory access operations are processed by the compute device of FIGS. 1 and 2.
Figure 8:
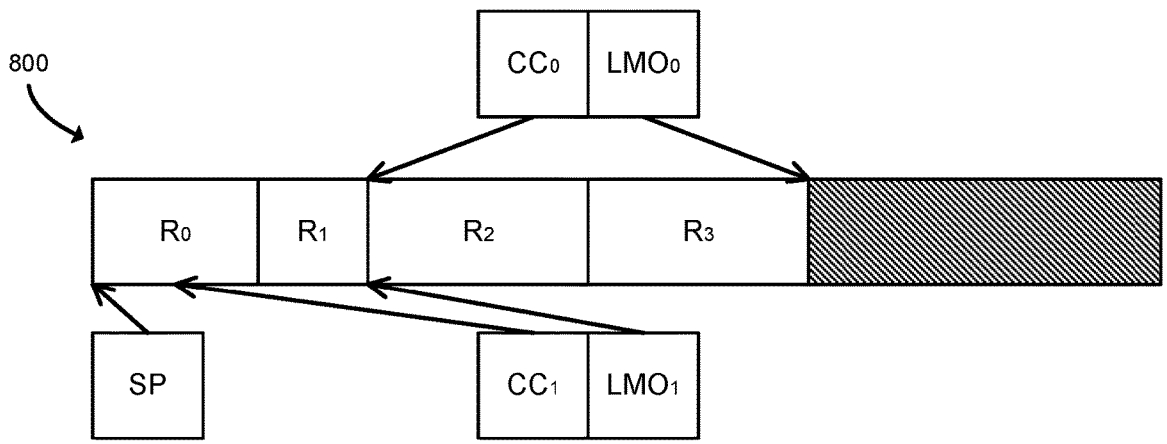
Figure 9:
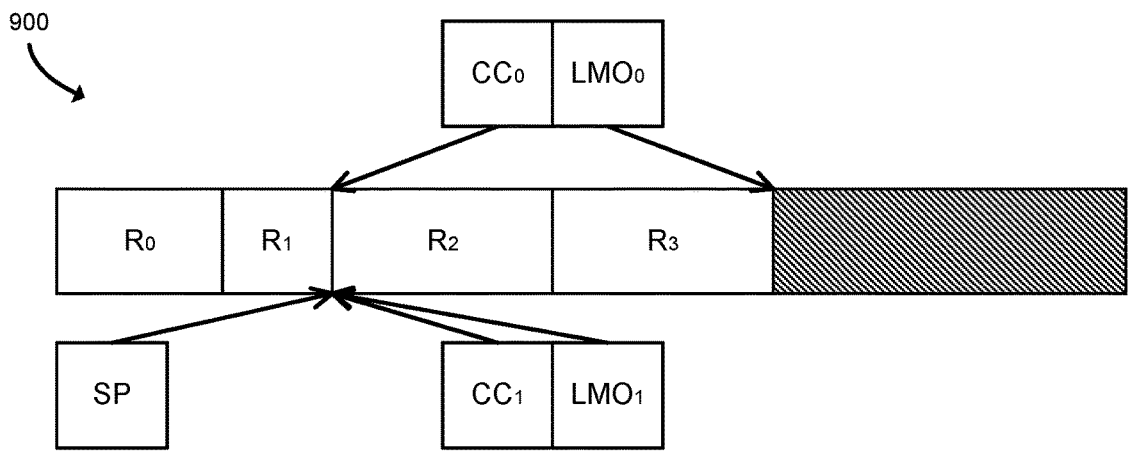
Figure 10:
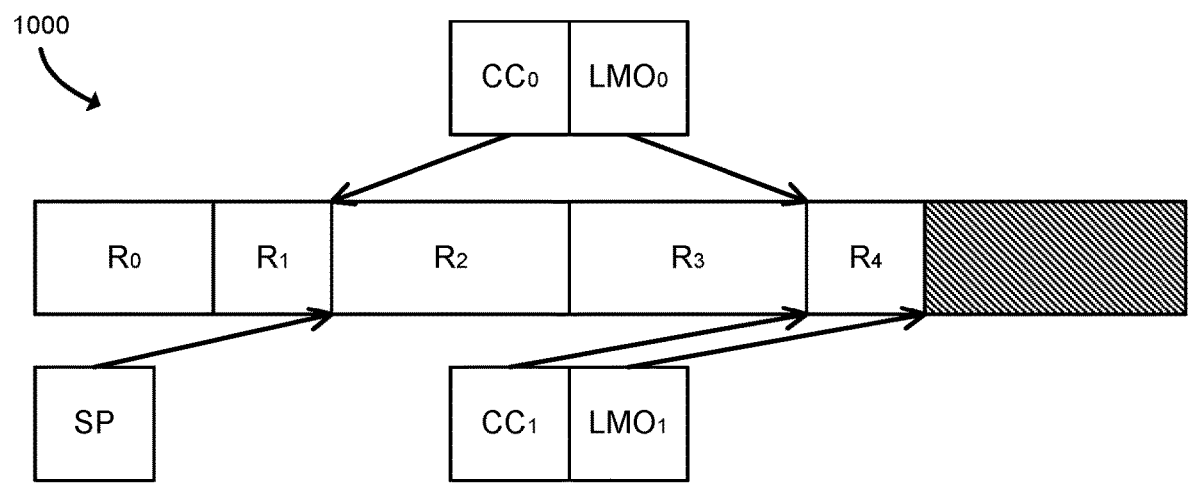

Referring now to FIG. 7, in one stage 700 of tracking a set of example remote memory buffer access requests, the compute device 110 has received two separate remote memory access requests, $R_0$ and $R_1$, to write to a buffer of the memory 204. One of two counter pairs has been assigned to track the completion of both of the access requests. As such, the LMO (i.e., $LMO_1$) of the assigned counter pair has advanced by the number of bytes to be written to the memory buffer, while the corresponding CC (i.e., $CC_1$) has not yet advanced because neither of the requests, $R_0$ and $R_1$, has completed yet. Additionally, the stable pointer is located at the beginning of the memory buffer. Referring now to FIG. 8, in a subsequent stage 800, the compute device 110 has received two additional access requests, $R_2$ and $R_3$, and the access request, $P_1$, has completed. Accordingly, the compute device 110 has advanced $CC_1$ by the amount of data operated on by $R_1$ and the compute device 110 has assigned the other available counter pair from the pool to track the completion of $R_2$ and $R_3$. In doing so, the compute device 110 initially sets the LMO (i.e., $LMO_0$) and the corresponding CC (i.e., $CC_0$) to the location of $LMO_1$, and then advances $LMO_0$ by the amount of data (e.g., number of bytes) to be operated on by $R_2$ and $R_3$. Referring now to FIG. 9, in a subsequent stage 900, the $R_0$ request has completed and the compute device 110 has advanced $CC_1$ by the amount of data operated on in the memory buffer for the $R_0$ request. In response to a determination that $CC_1$ is now equal to $LMO_1$, the compute device 110 retires the counter pair (i.e., $CC_1$ and $LMO_1$) and returns it to the pool of available (i.e., retired) counter pairs. Additionally, given that no remote memory access requests are operating on the region between the beginning of the memory buffer and the location of $CC_0$, the compute device 110 advances the stable pointer to the location of $CC_0$. Referring now to FIG. 10, in a subsequent stage 1000, the compute device 110 receives another access request, $R_4$. In response, the compute device 110 assigns the previously-retired counter pair, $LM0_1$ and $CC_1$, to the request. In doing so, the compute device 110 initially sets the values of $LMO_1$ and $CC_1$ to the value of $LMO_0$, and then advances $LMO_1$ by the amount of data to be operated on for the $R_4$ request.

EXAMPLES

Illustrative examples of the technologies disclosed herein are provided below. An embodiment of the technologies may include any one or more, and any combination of, the examples described below.

Example 1 includes a compute device for tracking the completion of accesses to a memory buffer, the compute device comprising a memory buffer; and a host fabric interface that includes a counter logic unit, wherein the counter logic unit is to establish multiple counter pairs for the memory buffer, wherein each counter pair includes a locally managed offset and a completion counter; receive a request from a remote compute device to access the memory buffer, wherein the request includes an amount of data to be read or written; assign one of the multiple counter pairs to the request; advance the locally managed offset of the assigned counter pair by the amount of data to be read or written; and advance the completion counter of the assigned counter pair as the data is read from or written to the memory buffer.

Example 2 includes the subject matter of Example 1, and wherein the counter logic unit is further to determine whether the completion counter of the assigned counter pair is equal to the locally managed offset of the assigned counter pair; and retire, in response to a determination that the completion counter is equal to the locally managed offset, the assigned counter pair.

Example 3 includes the subject matter of any of Examples 1 and 2, and wherein the counter logic unit is further to set a stable pointer to indicate a region of the memory buffer where all memory access requests for remote compute devices have been completed.

Example 4 includes the subject matter of any of Examples 1-3, and wherein the request is a first request, the assigned counter pair is a first counter pair, and the counter logic unit is further to receive a second request to access the memory buffer; assign, in response to a determination that the first counter pair is not yet retired and that a second counter pair is available, the second counter pair to the second request; and set the completion counter and the locally managed offset of the second counter pair to the locally managed offset of the first counter pair.

Example 5 includes the subject matter of any of Examples 1-4, and wherein the counter logic unit is further to advance the completion counter of the second counter pair as data associated with the second request is read from or written to the memory buffer.

Example 6 includes the subject matter of any of Examples 1-5, and wherein the counter logic unit is further to receive a second request to access the memory buffer; determine whether a predefined number of access requests have been associated with the counter pair; and assign, in response to a determination that the predefined number of access requests have not been associated with the counter pair, the counter pair to the received second request.

Example 7 includes the subject matter of any of Examples 1-6, and wherein the counter logic unit is further to advance the locally managed offset of the counter pair by an amount of data to be read or written in the second request.

Example 8 includes the subject matter of any of Examples 1-7, and wherein to establish multiple counter pairs comprises to establish a predefined number of counter pairs.

Example 9 includes the subject matter of any of Examples 1-8, and wherein to establish multiple counter pairs comprises to establish multiple counter pairs as a function of a desired granularity.

Example 10 includes the subject matter of any of Examples 1-9, and wherein to establish multiple counter pairs comprises to establish multiple counter pairs as a function of an amount of available tracker resources.

Example 11 includes the subject matter of any of Examples 1-10, and further including one or more processors; wherein the host fabric interface is located on a separate chip from the one or more processors of the compute device.

Example 12 includes the subject matter of any of Examples 1-11, and further including one or more processors; wherein the host fabric interface is included in a multi-chip package with the one or more processors of the compute device.

Example 13 includes the subject matter of any of Examples 1-12, and further including one or more processors; wherein the host fabric interface is integrated into at least one of the one or more processors.

Example 14 includes the subject matter of any of Examples 1-13, and further including one or more processors; and a memory; wherein the memory buffer is in the memory.

Example 15 includes a method for tracking the completion of accesses to a memory buffer, the method comprising establishing, by a compute device, multiple counter pairs for a memory buffer, wherein each counter pair includes a locally managed offset and a completion counter; receiving, by the compute device, a request from a remote compute device to access the memory buffer, wherein the request includes an amount of data to be read or written; assigning, by the compute device, one of the counter pairs to the request; advancing, by the compute device, the locally managed offset of the assigned counter pair by the amount of data to be read or written; and advancing, by the compute device, the completion counter of the assigned counter pair as the data is read from or written to the memory buffer.

Example 16 includes the subject matter of Example 15, and further including determining, by the compute device, whether the completion counter of the assigned counter pair is equal to the locally managed offset of the assigned counter pair; and retiring, by the compute device and in response to a determination that the completion counter is equal to the locally managed offset, the assigned counter pair.

Example 17 includes the subject matter of any of Examples 15 and 16, and further including setting a stable pointer to indicate a region of the memory buffer where all memory access requests for remote compute devices have been completed.

Example 18 includes the subject matter of any of Examples 15-17, and wherein the request is a first request and the assigned counter pair is a first counter pair, the method further comprising receiving, by the compute device, a second request to access the memory buffer; assigning, by the compute device and in response to a determination that the first counter pair is not yet retired and that a second counter pair is available, the second counter pair to the second request; and setting, by the compute device, the completion counter and the locally managed offset of the second counter pair to the locally managed offset of the first counter pair.

Example 19 includes the subject matter of any of Examples 15-18, and further including advancing, by the compute device, the completion counter of the second counter pair as data associated with the second request is read from or written to the memory buffer.

Example 20 includes the subject matter of any of Examples 15-19, and further including receiving, by the compute device, a second request to access the memory buffer; determining, by the compute device, whether a predefined number of access requests have been associated with the counter pair; and assigning, by the compute device and in response to a determination that the predefined number of access requests have not been associated with the counter pair, the counter pair to the received second request.

Example 21 includes the subject matter of any of Examples 15-20, and further including advancing, by the compute device, the locally managed offset of the counter pair by an amount of data to be read or written in the second request.

Example 22 includes the subject matter of any of Examples 15-21, and wherein establishing multiple counter pairs comprises establishing a predefined number of counter pairs.

Example 23 includes the subject matter of any of Examples 15-22, and wherein establishing multiple counter pairs comprises establishing multiple counter pairs as a function of a desired granularity.

Example 24 includes the subject matter of any of Examples 15-23, and wherein establishing multiple counter pairs comprises establishing multiple counter pairs as a function of an amount of available tracker resources.

Example 25 includes the subject matter of any of Examples 15-24, and wherein establishing the multiple counter pairs comprises establishing, with dedicated counter circuitry of a host fabric interface of the compute device, the multiple counter pairs.

Example 26 includes the subject matter of any of Examples 15-25, and further including setting, with the dedicated counter circuitry, a stable pointer to indicate a region of the memory buffer where all memory access requests for remote compute devices have been completed.

Example 27 includes the subject matter of any of Examples 15-26, and wherein assigning one of the counter pairs to the request comprises assigning, with the dedicated counter circuitry, one of the counter pairs to the request.

Example 28 includes the subject matter of any of Examples 15-27, and wherein advancing the locally managed offset of the assigned counter pair by the amount of data to be read or written comprises advancing, with the dedicated counter circuitry, the locally managed offset of the assigned counter pair by the amount of data to be read or written.

Example 29 includes the subject matter of any of Examples 15-28, and wherein advancing the completion counter of the assigned counter pair as the data is read from or written to the memory buffer comprises advancing, with the dedicated counter circuitry, the completion counter of the assigned counter pair as the data is read from or written to the memory buffer.

Example 30 includes one or more machine-readable storage media comprising a plurality of instructions stored thereon that, in response to being executed, cause a compute device to perform the method of any of Examples 15-29.

Example 31 includes a compute device for tracking the completion of accesses to a memory buffer, the compute device comprising one or more processors; one or more memory devices having stored therein a plurality of instructions that, when executed, cause the compute device to perform the method of any of Examples 15-29.

Example 32 includes a compute device for tracking the completion of accesses to a memory buffer, the compute device comprising means for performing the method of any of Examples 15-29.

Example 33 includes a compute device for tracking the completion of accesses to a memory buffer, the compute device comprising counter manager circuitry to establish multiple counter pairs for a memory buffer, wherein each counter pair includes a locally managed offset and a completion counter; network communicator circuitry to receive a request from a remote compute device to access the memory buffer, wherein the request includes an amount of data to be read or written; wherein the counter manager circuitry is further to assign one of the counter pairs to the request, advance the locally managed offset of the assigned counter pair by the amount of data to be read or written, and advance the completion counter of the assigned counter pair as the data is read from or written to the memory buffer.

Example 34 includes the subject matter of Example 33, and wherein the counter manager circuitry is further to determine whether the completion counter of the assigned counter pair is equal to the locally managed offset of the assigned counter pair; and retire, in response to a determination that the completion counter is equal to the locally managed offset, the assigned counter pair.

Example 35 includes the subject matter of any of Examples 33 and 34, and wherein the counter manager circuitry is further to set a stable pointer to indicate a region of the memory buffer where all memory access requests for remote compute devices have been completed.

Example 36 includes the subject matter of any of Examples 33-35, and wherein, the request is a first request, the assigned counter pair is a first counter pair, the network communicator is further to receive a second request to access the memory buffer; and the counter manager circuitry is further to assign, in response to a determination that the first counter pair is not yet retired and that a second counter pair is available, the second counter pair to the second request; and set the completion counter and the locally managed offset of the second counter pair to the locally managed offset of the first counter pair.

Example 37 includes the subject matter of any of Examples 33-36, and wherein the counter manager circuitry is further to advance the completion counter of the second counter pair as data associated with the second request is read from or written to the memory buffer.

Example 38 includes the subject matter of any of Examples 33-37, and wherein the network communicator circuitry is further to receive a second request to access the memory buffer, and the counter manager circuitry is further to determine whether a predefined number of access requests have been associated with the counter pair; and assign, in response to a determination that the predefined number of access requests have not been associated with the counter pair, the counter pair to the received second request.

Example 39 includes the subject matter of any of Examples 33-38, and wherein the counter manager circuitry is further to advance the locally managed offset of the counter pair by an amount of data to be read or written in the second request.

Example 40 includes the subject matter of any of Examples 33-39, and wherein to establish multiple counter pairs comprises to establish a predefined number of counter pairs.

Example 41 includes the subject matter of any of Examples 33-40, and wherein to establish multiple counter pairs comprises to establish multiple counter pairs as a function of a desired granularity.

Example 42 includes the subject matter of any of Examples 33-41, and wherein to establish multiple counter pairs comprises to establish multiple counter pairs as a function of an amount of available tracker resources.

Example 43 includes the subject matter of any of Examples 33-42, and further including a host fabric interface including dedicated counter circuitry, wherein to establish the multiple counter pairs comprises to establish the multiple counter pairs with the dedicated counter circuitry.

Example 44 includes the subject matter of any of Examples 33-43, and wherein the counter manager circuitry is further to set, with the dedicated counter circuitry, a stable pointer to indicate a region of the memory buffer where all memory access requests for remote compute devices have been completed.

Example 45 includes the subject matter of any of Examples 33-44, and wherein to assign one of the counter pairs to the request comprises to assign, with the dedicated counter circuitry, one of the counter pairs to the request.

Example 46 includes the subject matter of any of Examples 33-45, and wherein to advance the locally managed offset of the assigned counter pair by the amount of data to be read or written comprises to advance, with the dedicated counter circuitry, the locally managed offset of the assigned counter pair by the amount of data to be read or written.

Example 47 includes the subject matter of any of Examples 33-46, and wherein to advance the completion counter of the assigned counter pair as the data is read or written to the memory buffer comprises to advance, with the dedicated counter circuitry, the completion counter of the assigned counter pair as the data is read from or written to the memory buffer.

Example 48 includes a compute device for tracking the completion of accesses to a memory buffer, the compute device comprising circuitry for establishing multiple counter pairs for a memory buffer, wherein each counter pair includes a locally managed offset and a completion counter; circuitry for receiving a request from a remote compute device to access the memory buffer, wherein the request includes an amount of data to be read or written; means for assigning one of the counter pairs to the request; circuitry for advancing the locally managed offset of the assigned counter pair by the amount of data to be read or written; and circuitry for advancing the completion counter of the assigned counter pair as the data is read from or written to the memory buffer.

Example 49 includes the subject matter of Example 48, and further including circuitry for determining whether the completion counter of the assigned counter pair is equal to the locally managed offset of the assigned counter pair; and circuitry for retiring, in response to a determination that the completion counter is equal to the locally managed offset, the assigned counter pair.

Example 50 includes the subject matter of any of Examples 48 and 49, and further including circuitry for setting a stable pointer to indicate a region of the memory buffer where all memory access requests for remote compute devices have been completed.

Example 51 includes the subject matter of any of Examples 48-50, and wherein the request is a first request and the assigned counter pair is a first counter pair, the compute device further comprising circuitry for receiving a second request to access the memory buffer; means for assigning, in response to a determination that the first counter pair is not yet retired and that a second counter pair is available, the second counter pair to the second request; and circuitry for setting the completion counter and the locally managed offset of the second counter pair to the locally managed offset of the first counter pair.

Example 52 includes the subject matter of any of Examples 48-51, and further including circuitry for advancing the completion counter of the second counter pair as data associated with the second request is read from or written to the memory buffer.

Example 53 includes the subject matter of any of Examples 48-52, and further including circuitry for receiving a second request to access the memory buffer; circuitry for determining whether a predefined number of access requests have been associated with the counter pair; and means for assigning, in response to a determination that the predefined number of access requests have not been associated with the counter pair, the counter pair to the received second request.

Example 54 includes the subject matter of any of Examples 48-53, and further including circuitry for advancing the locally managed offset of the counter pair by an amount of data to be read or written in the second request.

Example 55 includes the subject matter of any of Examples 48-54, and wherein the circuitry for establishing multiple counter pairs comprises circuitry for establishing a predefined number of counter pairs.

Example 56 includes the subject matter of any of Examples 48-55, and wherein the circuitry for establishing multiple counter pairs comprises circuitry for establishing multiple counter pairs as a function of a desired granularity.

Example 57 includes the subject matter of any of Examples 48-56, and wherein the circuitry for establishing multiple counter pairs comprises circuitry for establishing multiple counter pairs as a function of an amount of available tracker resources.

Example 58 includes the subject matter of any of Examples 48-57, and wherein the circuitry for establishing the multiple counter pairs comprises dedicated counter circuitry of a host fabric interface for establishing the multiple counter pairs.

Example 59 includes the subject matter of any of Examples 48-58, and further including dedicated counter circuitry for setting a stable pointer to indicate a region of the memory buffer where all memory access requests for remote compute devices have been completed.

Example 60 includes the subject matter of any of Examples 48-59, and wherein the circuitry for assigning one of the counter pairs to the request comprises dedicated counter circuitry for assigning one of the counter pairs to the request.

Example 61 includes the subject matter of any of Examples 48-60, and wherein the circuitry for advancing the locally managed offset of the assigned counter pair by the amount of data to be read or written comprises dedicated counter circuitry for advancing the locally managed offset of the assigned counter pair by the amount of data to be read or written.

Example 62 includes the subject matter of any of Examples 48-61, and wherein the circuitry for advancing the completion counter of the assigned counter pair as the data is read from or written to the memory buffer comprises dedicated counter circuitry for advancing the completion counter of the assigned counter pair as the data is read from or written to the memory buffer.

The invention claimed is:

1. A compute device for tracking the completion of accesses to a memory buffer, the compute device comprising:
   a memory buffer; and
   a host fabric interface that includes a counter logic unit, wherein the counter logic unit is to:
      establish multiple counter pairs for the memory buffer, wherein each counter pair includes a locally managed offset and a completion counter;
      receive a request from a remote compute device to access the memory buffer, wherein the request includes an amount of data to be read or written;
      assign one of the multiple counter pairs to the request;
      advance the locally managed offset of the assigned counter pair by the amount of data to be read or written; and
      advance the completion counter of the assigned counter pair as the amount of data is read from or written to the memory buffer.

2. The compute device of claim 1, wherein the counter logic unit is further to:
   determine whether the completion counter of the assigned counter pair is equal to the locally managed offset of the assigned counter pair; and
   retire, in response to a determination that the completion counter is equal to the locally managed offset, the assigned counter pair.

3. The compute device of claim 1, wherein the counter logic unit is further to set a stable pointer to indicate a region of the memory buffer where all memory access requests for remote compute devices have been completed.

4. The compute device of claim 1, wherein the request is a first request, the assigned counter pair is a first counter pair, and the counter logic unit is further to:
   receive a second request to access the memory buffer;
   assign, in response to a determination that the first counter pair is not yet retired and that a second counter pair is available, the second counter pair to the second request; and
   set the completion counter and the locally managed offset of the second counter pair to the locally managed offset of the first counter pair.

5. The compute device of claim 4, wherein the counter logic unit is further to advance the completion counter of the second counter pair as data associated with the second request is read from or written to the memory buffer.

6. The compute device of claim 1, wherein the counter logic unit is further to:
receive a second request to access the memory buffer;
determine whether a predefined number of access requests have been associated with the assigned counter pair; and
assign, in response to a determination that the predefined number of access requests have not been associated with the assigned counter pair, the assigned counter pair to the received second request.

7. The compute device of claim 6, wherein the counter logic unit is further to advance the locally managed offset of the assigned counter pair by an amount of data to be read or written in the second request.

8. The compute device of claim 1, wherein to establish multiple counter pairs comprises to establish a predefined number of counter pairs.

9. The compute device of claim 1, wherein to establish multiple counter pairs comprises to establish multiple counter pairs as a function of a desired granularity.

10. The compute device of claim 1, wherein to establish multiple counter pairs comprises to establish multiple counter pairs as a function of an amount of available tracker resources.

11. The compute device of claim 1, further comprising:
one or more processors;
wherein the host fabric interface is located on a separate chip from the one or more processors of the compute device.

12. The compute device of claim 1, further comprising:
one or more processors;
wherein the host fabric interface is included in a multi-chip package with the one or more processors of the compute device.

13. The compute device of claim 1, further comprising:
one or more processors;
wherein the host fabric interface is integrated into at least one of the one or more processors.

14. The compute device of claim 1, further comprising:
one or more processors; and
a memory;
wherein the memory buffer is in the memory.

15. One or more non-transitory machine-readable storage media comprising a plurality of instructions stored thereon that, in response to being executed, cause a compute device to:
establish multiple counter pairs for a memory buffer, wherein each counter pair includes a locally managed offset and a completion counter;
receive a request from a remote compute device to access the memory buffer, wherein the request includes an amount of data to be read or written;
assign one of the counter pairs to the request;
advance the locally managed offset of the assigned counter pair by the amount of data to be read or written; and
advance the completion counter of the assigned counter pair as the amount of data is read from or written to the memory buffer.

16. The one or more machine-readable storage media of claim 15, wherein, when executed, the plurality of instructions further cause the compute device to:
determine whether the completion counter of the assigned counter pair is equal to the locally managed offset of the assigned counter pair; and
retire, in response to a determination that the completion counter is equal to the locally managed offset, the assigned counter pair.

17. The one or more machine-readable storage media of claim 15, wherein, when executed, the plurality of instructions further cause the compute device to set a stable pointer to indicate a region of the memory buffer where all memory access requests for remote compute devices have been completed.

18. The one or more machine-readable storage media of claim 15, wherein the request is a first request, the assigned counter pair is a first counter pair, and when executed, the plurality of instructions further cause the compute device to:
receive a second request to access the memory buffer;
assign, in response to a determination that the first counter pair is not yet retired and that a second counter pair is available, the second counter pair to the second request; and
set the completion counter and the locally managed offset of the second counter pair to the locally managed offset of the first counter pair.

19. The one or more machine-readable storage media of claim 18, wherein, when executed, the plurality of instructions further cause the compute device to advance the completion counter of the second counter pair as data associated with the second request is read from or written to the memory buffer.

20. The one or more machine-readable storage media of claim 15, wherein, when executed, the plurality of instructions further cause the compute device to:
receive a second request to access the memory buffer;
determine whether a predefined number of access requests have been associated with the assigned counter pair; and
assign, in response to a determination that the predefined number of access requests have not been associated with the assigned counter pair, the assigned counter pair to the received second request.

21. The one or more machine-readable storage media of claim 20, wherein, when executed, the plurality of instructions further cause the compute device to advance the locally managed offset of the assigned counter pair by an amount of data to be read or written in the second request.

22. The one or more machine-readable storage media of claim 15, wherein to establish multiple counter pairs comprises to establish a predefined number of counter pairs.

23. The one or more machine-readable storage media of claim 15, wherein to establish multiple counter pairs comprises to establish multiple counter pairs as a function of a desired granularity.

24. The one or more machine-readable storage media of claim 15, wherein to establish multiple counter pairs comprises to establish multiple counter pairs as a function of an amount of available tracker resources.

25. The one or more machine-readable storage media of claim 15, further comprising:
a host fabric interface including dedicated counter circuitry,
wherein to establish the multiple counter pairs comprises to establish the multiple counter pairs with the dedicated counter circuitry.

26. The one or more machine-readable storage media of claim 25, wherein, when executed, the plurality of instructions further cause the compute device to set, with the dedicated counter circuitry, a stable pointer to indicate a region of the memory buffer where all memory access requests for remote compute devices have been completed.

27. A compute device for tracking the completion of accesses to a memory buffer, the compute device comprising:
- circuitry for establishing multiple counter pairs for a memory buffer, wherein each counter pair includes a locally managed offset and a completion counter;
- circuitry for receiving a request from a remote compute device to access the memory buffer, wherein the request includes an amount of data to be read or written;
- means for assigning one of the counter pairs to the request;
- circuitry for advancing the locally managed offset of the assigned counter pair by the amount of data to be read or written; and
- circuitry for advancing the completion counter of the assigned counter pair as the amount of data is read from or written to the memory buffer.

28. A method for tracking completion of accesses to a memory buffer, the method comprising:
- establishing, by a compute device, multiple counter pairs for a memory buffer, wherein each counter pair includes a locally managed offset and a completion counter;
- receiving, by the compute device, a request from a remote compute device to access the memory buffer, wherein the request includes an amount of data to be read or written;
- assigning, by the compute device, one of the counter pairs to the request;
- advancing, by the compute device, the locally managed offset of the assigned counter pair by the amount of data to be read or written; and
- advancing, by the compute device, the completion counter of the assigned counter pair as the amount of data is read from or written to the memory buffer.

29. The method of claim 28, further comprising:
- determining, by the compute device, whether the completion counter of the assigned counter pair is equal to the locally managed offset of the assigned counter pair; and
- retiring, by the compute device and in response to a determination that the completion counter is equal to the locally managed offset, the assigned counter pair.

30. The method of claim 28, further comprising setting a stable pointer to indicate a region of the memory buffer where all memory access requests for remote compute devices have been completed.

* * * * *